United States Patent Office 3,579,320
Patented May 18, 1971

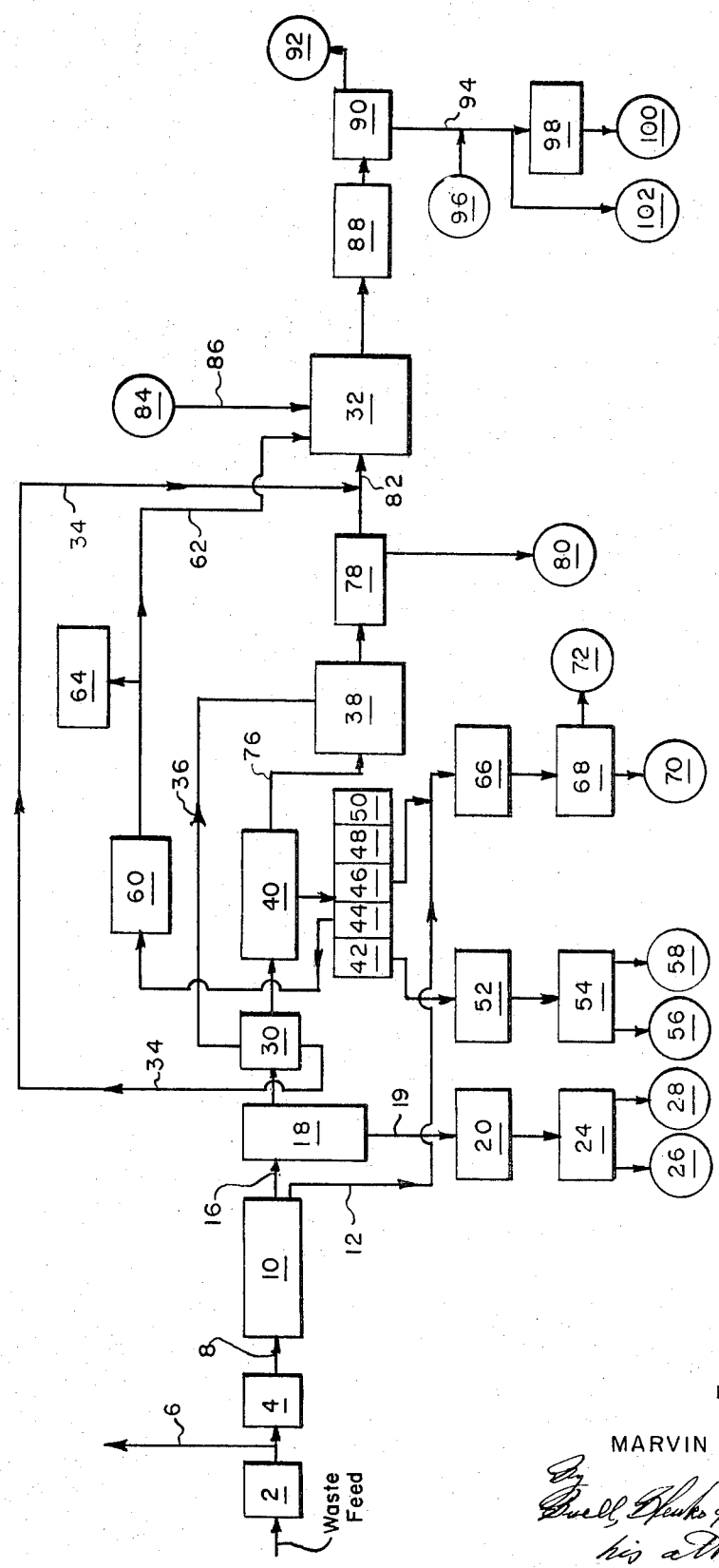

1

3,579,320
PROCESS FOR PRODUCING AND RECOVERING VALUABLE MATERIALS FROM MUNICIPAL WASTE
Marvin Presses, Liberty Township, Trumbull County, Ohio, assignor to General Ecological Systems, Inc., Pittsburgh, Pa.
Filed Aug. 18, 1969, Ser. No. 850,808
Int. Cl. C05f 11/08
U.S. Cl. 71—9                                        6 Claims

ABSTRACT OF THE DISCLOSURE

A process for producing and recovering valuable materials from a burden comprising a mixture of organic and inorganic waste materials comprising the steps of separating large refuse items from the burden and separately recovering same; opening containers of refuse present in the burden and separately recovering the containers; subjecting the burden to a magnetic separation operation and separately recovering the magnetic materials; classifying the non-magnetic materials according to size ranges; removing discrete items of refuse such as glass, plastic, metals, paper and the like from the large size range material and separately recovering the discrete refuse items; comminuting the large and intermediate size range materials and combining the comminuted material with the small size range material to form an organic mass; composting the organic mass, preferably in a mixture with raw sewage; and recovering a sterile compost.

---

This invention relates to a process for producing and recovering valuable materials from municipal waste; more particularly to a process for producing a sterile compost from a mixture of waste materials including garbage, sewage, trash and the like while simultaneously recovering other valuable components from the mixture.

Municipal waste materials such as garbage, sewage, trash and the like have long been recognized as a source for soil conditioners. Earlier proposals for producing soil conditioners from waste materials have been unsatisfactory. One major shortcoming is that, heretofore, there has been no practical process available for extracting from the raw bulk waste material that portion of it which is most useful for soil conditioning purposes. Methods for producing a compost from organic waste materials are well-known and are used by some municipalities but they depend upon initial segregation of waste materials by the populace (usually pursuant to legislation) according to specified categories; i.e., food waste, cans and bottles, paper trash, etc. The known composting methods can process, for example, food waste once it is segregated; but the remaining waste materials such as metallics, plastics and paper must be disposed of by the traditional techniques of land fill, incineration and the like.

Another difficulty encountered in prior art waste conversion processes is that the composition of waste materials varies from one urban area to another and within a single urban area itself. For example, the nature of waste and refuse materials may differ from new areas of a city to an old area and from high economic strata areas to poor economic areas as well as between areas which show high concentrations of different ethnic groups. This means that any process for handling such waste materials must be flexible and be capable of dealing with materials of widely varying nature and composition.

2

A further complication which earlier workers encountered is that any recovery process must reclaim or reutilize most of the constituents of the waste material in order to be economically feasible, and must do so without contributing to the problems already prevalent in waste disposal methods; namely, air pollution, water pollution, pest infestation, propogation of deleterious bacteria, and the like. Neither incineration, land-fill nor baling satisfy this latter requirement.

I have discovered a method for processing municipal waste to produce useful end products from practically all of the matter contained in the waste. The process requires no initial segregation of waste materials by the citizenry and can accommodate materials of widely varying composition. Moreover, my process does not contribute to public health, accident and nuisance hazards heretofore associated with waste treatment processes. The fact that no noxious fumes or dust is produced by the invention permits treatment plants embodying my invention to be conveniently located to the sources of collection of the waste materials.

I provided a process for producing and recovering valuable materials from a burden comprising a mixture of materials such as are found in municipal waste, some of the materials being carried in containers such as paper and plastic bags. I prefer to first separate the burden by a sizing operation into a larger piece size portion and a smaller piece size portion and thereafter separate the larger piece size portion according to selected product categories. This latter step enables me to separately recover the materials in each product category.

Preferably, I provide the step of puncturing the containers of waste materials present in the smaller piece size portion from the sizing operation to allow their contents to mix with the remainder of the smaller piece size portion. I prefer to apply a suction to the smaller piece size portion to remove at least a portion of the containers from the smaller piece size portion; and then to recover the containers.

Next, I provide the step of subjecting the smaller piece portion to a magnetic separation operation to provide a magnetic portion and a non-magnetic portion. This step is preferably followed by breaking up the magnetic portion to release magnetic particles therefrom; subjecting the broken-up magnetic portion to a further magnetic separation operation to provide a magnetic component and a non-magnetic component; and separately recovering the magnetic component and the non-magnetic component.

Further, I provide the step of removing discrete portions of manufactured goods from said non-magnetic portion leaving a substantially organic mass, the manufactured goods comprising glass, plastics, fabrics, metals, fiberboard, paper and the like, and separately recovering the manufactured goods. More particularly, I prefer to classify the non-magnetic portion of the smaller piecesize portion into size range components, the size range components comprising at least a small size range component, an intermediate size range component and a large range size component; subjecting the large size range component to a picking operation to remove discrete materials therefrom according to selected product categories, the product categories comprising at least glass, plastics, fabrics, metals, fiberboard and paper; and separately recovering the materials in each of the selected product categories.

Next, I provide the step of subjecting the organic mass to a size reduction operation, preferably by comminuting the picked large size range component and the intermediate size range component; then combining the small size range component with these comminuted materials. Preferably, I feed the comminuted large and intermediate size range components onto an inclined surface to release dense, resilient materials therefrom and allow the dense, resilient materials to flow down the inclined surface and be removed; and combine the materials remaining on the inclined surface with the small size range component to form a uniform, homogeneous organic mass.

I prefer to provide adding raw sewage and at least a portion of the paper recovered earlier in the process to the organic mass.

Finally, I provide the steps of adding aerobic bacteria to the organic mass, composting the organic mass to form a sterile compost and recovering the compost.

By means of this process, the organic waste matter decomposes to produce humus fertilizer of a quality equal to stable manure in chief animal nutrient and trace elements and superior in microflora and plant hormones. In addition, other valuable components of the municipal waste materials including glass, ferrous and non-ferrous metallic scrap, paper and cardboard are recovered in forms suitable for resale.

Composting is a process in which micro-organisms break down organic matter to a relatively stable humus-like material. It is distinguished from digestion or fermentation in that the decomposing material is primarily discrete solids with open pore spaces rather than solids in a liquid or semi-liquid environment. Composting processes vary from anaerobic to aerobic and from mesophilic to thermophilic decomposition. However, aerobic thermophilic composting provides the most rapid and complete decomposition of the readily oxidizable or putrescible matter. This is the only known method which is sanitary and nuisance free and which results in materials which will not referment, contain pathogens, or be a health and nuisance hazard. The process is competitive economically with other accepted methods of waste treatment and disposal presently in use, but does not suffer any of their inherent handicaps.

Other details, objects and advantages of the invention will become apparent as the following description of a present preferred method of practicing the same proceeds.

The starting material for the process, referred to herein as "municipal waste," comprises an agglomeration of organic and inorganic materials including (1) household garbage and trash; (2) commercial waste such as restaurant refuse and swill, paper wastes, food processing wastes, etc.; and (3) agricultural wastes such as grass clippings, leaves, plants, manure, etc. A unique advantage of the invention is that raw sewage may be introduced into the process at a later stage thus affording complete disposal of all waste materials generated by a particular populace except heavy industrial waste. A generalized example of such municipal waste is as follows (indicated percentages being by weight):

| | Percent |
|---|---|
| Inert material (e.g., glass, metals, plastics, porcelain) | 22 |
| Paper, wood and the like | 50 |
| Food wastes | 28 |

A mixture of the foregoing constituents has the following characteristics:

| | Percent |
|---|---|
| pH (average) 4,7–6,4. | |
| Moisture content (by weight) | 42.4–66.1 |
| Volatile solids content (average by weight) | 60.6 |

Table I gives more detailed examples of the analyses of municipal waste generated by two cities. The figures for City No. 1, an eastern community of 50,000 people are expressed in tons of material per day. City No. 2 is a west coast metropolitan area and its figures are expressed in percentages by weight.

TABLE I

City Number 1

Material:

| | |
|---|---|
| Dust and fine ash | 59,920 |
| Cinders | 15,260 |
| Paper | 6,160 |
| Ferrous metals | 3,360 |
| Non-ferrous | 28 |
| Rags | 350 |
| Bottles | 574 |
| Cullet | 308 |
| Garbage | 60,062 |
| Total | 146,022 |

City Number 2

Material:

| | |
|---|---|
| Paper | 46.1 |
| Yard trimmings | 21.1 |
| Wood | 7.5 |
| Rags | 3.5 |
| Rubber | 4.7 |
| Plastic | 0.3 |
| Garbage | 0.8 |
| Metals | 7.7 |
| Glass | 8.3 |

A typical process embodying the invention is illustrated in schematic flowsheet form in the single figure of the accompanying drawing. In this process, garbage and refuse trucks deliver municipal waste to a plant which operates on a twenty-four hour basis. The capacity of the plant will, of course, depend upon the amount of waste deposited at the plant during a normal day. When those figures are ascertained, the design parameters and equipment capacities of the plant will thus be readily determinable by those skilled in the art.

The muncipal waste is discharged onto a grizzly 2 at the base of a conveyor-fed silo 4. As is well known, a grizzly is a platform, usually inclined, constructed of rails or beams arranged in parallel relationship. In the present invention, the space between adjacent rails or beams is about 18 inches. Oversized items such as refrigerators, washing machines, tree trunks, tires and the like do not pass through the openings and are diverted by the sloping grizzly toward an accumulation area as indicated by the arrow 6.

At the accumulation area, items which are predominantly metallic are loaded into containers for trans-shipment to scrap dealers. Items which are predominanly organic, such as tree trunks, tires and the like, are stored in individual containers for subsequent movement to milling equipment. The balance of the waste passes through the spaced rails or beams of the grizzly and is carried by conveyor to the silo 4 for storage. While the accompanying figure shows one feed line leading through the process it is to be understood that a plurality of feed lines together with associated equipment may be used in the invention depending upon the quantity of waste to be processed.

From the silo 4, waste material is fed onto moving belt conveyors and carried in the direction of the arrow 8 to an "opener" 10. The opener 10 is preferably a rotary drum having spike-shaped members protruding from the inside walls thereof. The purpose of the opener 10 is to tear apart and open any bags or other containers of waste materials such as are usually present in municipal waste. The spike-shaped members puncture the bags or containers as the drum is rotated, thereby allowing the contained waste materials to spill out and mix with other waste materials present. Other types of apparatus which are capable of agitating the waste material with sufficient force to open any containers of waste may be used in place of the particular apparatus described herein. The opener 10, like all the other equipment utilized in the process, is housed to prevent the dissemination of dust and odors.

A strong suction is applied to the chamber of the rotary drum to draw off the torn paper or plastic bags as indicated by the arrow 12. These materials are deposited at zone 66 for further processing to be described hereinafter.

The waste material is fed onto a belt conveyor and advanced toward the classifier 30 in the direction indicated by arrow 16. Magnetic scalpers 18 positioned above the belt conveyor remove the magnetic materials such as iron bars, steel cans and the like from the advancing waste material. The magnetic material is fed by conveyor as indicated by the arrow 19 to a crusher 20. The crushed or shredded magnetic material is pased to a magnetic separator 24 which further separates the magnetic materials released by the crushing operation. The magnetic product 26 is a ferrous particulate suitable for use in chemical processes, for example, copper cementation processes. The non-magnetic product 28 of the magnetic separation operation is recovered and resold as scrap metal. Among the recoverable non-ferrous metals are zinc, aluminum, copper and lead.

After passing under the magnetic scalpers 18, the mainstream of the waste material passes to a classifier 30. The equipment used for the classifying operation may be vibrating screens, rotating perforated drums or other suitable apparatus. At the classifier, the waste material is separated according to size; preferably, into three size range components. In the preferred embodiment of the invention, dual screens are provided having openings of progressively diminishing size. The small size range component, preferably minus ⅜ inch material, passes through both screens and is carried by a belt conveyor to the reactor or compositor 32, the movement being indicated by the arrow 34. Waste material in the intermediate size range component, preferably in the range from plus ⅜ inch to 1½ inch passes through the first screen and is received by a belt conveyor which advances the material in the direction indicated by the arrow 36 to a further size reduction operation 38. The large size range component, preferably plus 1½ inch material, is fed out onto a belt conveyor and advanced to the picking operation 40.

As the waste material is undergoing classification, a high velocity air stream is directed over the material to release and remove light-weight plastics.

As stated above, the plus 1½ inch waste material passes from the classifier 30 onto a conveyor belt which carries the material past "pickers" who remove discrete pieces of glass, paper, plastics, non-magnetic metals, rags, and the like from the waste material. These materials are manually classified according to their composition by placing them into chutes labelled glass 42, paper 44, plastic 46, metals 48 and rags 50. The segregated materials are conveyed from the chutes to their appropriate storage containers or stations for further processing. The picking operation 40 is here described as a manual operation but could be accomplished mechanically as well.

The glass or "cullet" from the chute 42 at the picking operation is conveyed first to a crusher 52 where it is crushed to 100 percent minus 1 inch material. The crushed cullet is then fed through an optical separator 54 which is an electronic/optical device which can detect small optical differences or minor shading differences between constituents. The unit operates as follows: Particles are fed mechanically and are inspected electro-optically; and predetermined types of particles are removed by a precisely controlled air blast.

More particularly, the mixture of clear and colored glass to be separated is fed into a hopper from which it is moved by a vibrating feeder into a grooved endless belt running at high speed. The particles after forming a single line on this belt, are projected in a continuous stream to be viewed in mid-air in the optical box. Photocell assemblies are arranged within each viewing area at 120 degree intervals and a suitable illumination is provided. Each photocell head is aimed with a lens system across the viewing area background on the opposite side of the box. While falling through the optical box assembly each particle passes through a center of a tree lens wide angle viewing system receiving a complete surface inspection from all sides. Any piece whose color or shade differs from the set standard causes a change in the output voltage to at least one of the photocells. This photocell signal is amplified by an electronic circuit and is used to trigger a short blast of compressed air jet which deflects the unwanted particle from the main stream. This results in the complete separation of clear glass 56 from colored glass 58 and allows the plant to produce saleable cullet.

The paper and cardboard products collected during the picking operation 40 pass from the paper chute 44 to an evaluation zone where paper products such as dry newspapers or dry cardboard which are suitable for immediate sale are removed. The remainder of the paper is conveyed to a shredder 60. A portion of the shredded paper material is conveyed (as indicated by the arrow 62) to the compostor 32 to be used there for controlling moisture content of the feed (as will be described hereinbelow). Any excess shredded paper is burned in the incinerator 64.

The heterogeneous miscellany of plastics collected during the picking operation 40 in chute 46 is pelletized, briquetted along with the plastic materials removed from the opener 10 at zone 66 and then conveyed to a destructive distillation or pyrolysis apparatus 68. This is a continuous vertical unit in which destructive distillation in an inert atmosphere is carried out. It is normally desirable to reduce the residence time of the particles in the unit to less than an hour. Accordingly, the refuse is broken down to particles preferably not larger than 3 inches in diameter. There may also be a restriction on the maximum diameter of the heated pyrolysis vessel imposed by the requirement that the rate of heat transfer between the vessel walls and any particle be kept high. In my preferred unit, the combustion gases fall over the pyrolyzing solids as they descend through the shaft. The heat required for the pyrolysis is supplied by combustion of some of the gases generated during pyrolysis. The products of destructive distillation are coke 70 and an admixture of chemical compounds 72; the former being suitable for resale and the latter being potentially useful as a starting material in the production of polymeric compounds.

The metals collected at chute 48 in the picking operation 40 may be resold as scrap. Likewise the rags collected at chute 50 may be baled, strapped and prepared for sale.

Returning to the progression of the waste material, the plus ⅜ inch to 1½ inch material, having passed through the classifier, is fed to a hammermill 38 as indicated by the arrow 36. The mainstream 76 of the waste passing through picking operation 40 is also fed to the hammermill 38. In the hammermill 38, waste material is reduced to particles of substantially uniform size.

The waste material is discharged from the hammermill 38 onto an inclined conveyor-separator 78. This is a unit having an inclined plate conveyor travelling upwardly. The plates are steel and when the waste is dropped onto the center of the incline, small pieces of dense, resilient material such as glass and metal flow or bounce down the incline against the direction of conveyor movement. These aggregated glass and metal particles 80 may be separately recovered. The remainder of the material remains on the conveyor and is carried upwardly on the conveyor to a discharge point as indicated by the arrow 82. The plate conveyor can be readily adjusted as to inclination and speed for different loadings and variations.

The substantially organic waste material discharged from the conveyor-separator 78 is fed into a compostor 32. At the same time, the small size range component from the classifier 30 is being fed into the compostor 32 as indicated by the arrow 34. It is at this point that raw sewage, preferably partially dried sludge, may be mixed with the waste. It is also at this point that the paper recovered earlier and shredded at 60 is added to control the moisture content of the waste burden. The greater the fluidity of the sewage, the greater the amount of paper which must be added. The resultant mixture is a pulp-like mass.

The compostor 32 may take a variety of forms as is well known in the art. I prefer a steel structure having a minimum of 8 hearths or floors or decks. Each deck is fitted with 16 or more slowly rotating plows driven from a vertical central shaft. The waste material is pushed outward on one deck, inward on the next toward openings through which it falls to the next stage. Thermostatic controls and exhaust dampers create and maintain an optimum environment in each stage of the digestion process. Specially cultured depureating aerobic bacteria 84 are added to input waste through an automatic hopper feed as indicated by the arrow 86. Preferably, the bacteria addition rate is a minimum of 10 billion per ton of waste feed.

On the first or top hearth, the first stage of digestion begins. Bacteria sythesize sugars and multiply rapidly producing starch-digesting enzymes. The rate of growth of aerobic bacteria is immediately inhibited. The temperature at this stage is 80° to 100° F. In the second hearth, proteolytic bacteria produce enzymes to break down proteins into amino acids. Sulphates of ammonia, nitrates and nitrites are produced, which are then utilized by cellulose organisms in the next stage. The temperature at this second hearth is 100° to 110° F. On the third deck the rate of bacterial oxidation rises. Cellulose bacteria multiply and start breaking down hemicelluloses, alphacelluloses and lignin. The temperature here is 110° to 130° F. In decks 4 through 8, thermicaerobes heat and further tenderize resistant tissues, and hydrolize and dehydrate descending bacterial bodies and organic matter. Resistant anaerobes and spores are, in most cases, either split, or their interiors steamed and hydrolized or attacked in their tenderized conditions, so that starch, protein, or mineral content of each organism is digested by enzymes which could not penetrate cell membranes before "cooking." Aeration and digestion combine to eliminate anaerobic growth and prevent the precondition for reheating. The final drying is accelerated by a suction blower, drawing controlled air flow through the lower deck filtering screens. The temperature at this stage is between 130° and 180° F. Residence time for the waste material in the composter 32 is about 24 hours.

The product of digestion is a sterile compost characterized by a pH in the range of 6.6 to 8.5, a moisture content in the undried state of 41.5 to 59.2 percent by weight, and an average volatile solids content of 60.6 percent by weight.

The sterile compost is removed from the compostor 32 by belts to a dryer 88 which is heated by the waste heat from the incinerator 64 described hereinabove.

From the drier 88, the compost goes to an inertial or ballastic separator 90. This consists of a high speed horizontal rotor and a large horizontal enclosure with 3 hoppers. Impellers, normally short pieces of railroad rails mounted on the rotor, strike the ground material and fling it horizontally or at a slight upward angle. The flying materials assume various trajectories along the length of the stilling chamber. Dense and resilient particles have a high inertial speed and low trajectory. Light and soft particles have a low initial velocity and short trajectory. In a 25 ft. chamber, for example, about ¾ of the length of the chamber is used to retain compostible materials. The remainder are non-compostibles. The compartments of the stilling chamber each have screw conveyors to move the material to the discharge openings. The ballistic separator 90 relies on ballistic or gravity separation to remove small pieces of material 92 such as pebbles, stones, glass, metals, cinders, ceramics, and the like may still be in the compost.

The clean, sterile, and dried product is discharged from the ballistic separator as indicated by the arrow 94. If desired, chemical fertilizer 96 may be added to the compost. The compost may then be subjected to a pressing operation 98 if bales 100 are desired; or it may be placed in bags 102.

The process of the invention affords a high degree of recovery of metallic, plastic, glass, fabric and cellulose components from municipal waste. At the same time, the process produces a highly refined compost substantially free of non-compostible materials.

Table II shows a typical example of the analyses of the waste material at various stages in the process (percentages by weight):

TABLE II

| Raw waste burden | Percent | Of the 67.7% compostibles Material | Composting Before | After |
|---|---|---|---|---|
| Tin cans | 9.8 | Ash, percent | 27.59 | 43.63 |
| Glass | 11.7 | Carbon (C), percent | 36.40 | 27.85 |
| Rags | 1.6 | Nitrogen (N) percent | 1.09 | 1.98 |
| Non-ferrous metals | 0.9 | Phosphorus (P), percent | 0.20 | 0.30 |
|  |  | P$_2$O$_5$, percent | 0.91 | 1.33 |
| Plastics | 5.6 | Potassium (K), percent | 0.27 | 0.39 |
| Compostibles | 67.7 | K$_2$O, percent | 0.83 | 0.99 |
|  |  | C/N ratio | 33.0 | 23.0 |

The composting of municipal waste is enhanced by the addition of raw sewage sludge because of the higher nutrient content of raw sewage as compared with water or digested sludge. The addition of raw sewage adds little to the cost of composting but saves an estimated 40 to 50 percent of the cost required for a complete sewage treatment plant fitted out for normal sludge digestion and air drying or dewatering. It is possible to adequately thicken the raw or digestive sludges so that all refuse and sludge from the same contributory population may be mixed satisfactorily to result in optimum moisture content for composting. In addition, the composting process completely destroys viable seed and plant pathogens that may be present in normal sewage sludges.

At all stages of the process, equipment is enclosed or hooded to prevent the emission of odors and dust and vents are employed to ensure that the proper oxidation rate is maintained. These procedures afford the control necessary to maintain an aerobic environment throughout, thereby minimizing the amount of malodorous products produced by anaerobic bacteria.

The process yields a product having uniform stability and fertility. Table III shows a typical detailed analysis of the compost (percentages by weight):

TABLE III pH 6.3
Organic matter (dry basis)—93.0%
Lbs. organic matter per ton—1680 lbs.
Nitrogen—1.5%
Phosphorus ($P_2O_5$)—0.08%
Potassium—0.08%
Magnesium—0.3%
Calcium—5%
Sodium—0.03%
Sulphate—1700 pts./million
Boron—5 pts./million
Manganese—traces
Copper—1650 pts./million
Chlorine—320 pts./million
Iron—1300 pts./million
Zinc—400 pts./million This product is an excellent source of organic matter for a variety of agricultural applications. The stability of the compost makes it highly suitable for the acceptance of chemical additives. The compost is non-toxic and may be used without endangering humans or animals. It is also suitable as a litter for animals and as a soil for cultivating mushrooms.

I claim:

1. A process for recovering valuable materials from a burden comprising a mixture of organic and inorganic materials such as are found in municipal waste, at least a portion of said materials being carried in containers, which comprises the steps of:
   (A) separating said burden by a sizing operation into a larger piece size portion and a smaller piece size portion;
   (B) separating said larger piece size portion according to selected product categories;
   (C) recovering the materials in each said product category;
   (D) agitating said smaller piece size portion with sufficient force to open said containers of materials present in said smaller piece size portion and thereby permit their contents to mix with the remainder of said smaller piece size portion;
   (E) applying a suction to said smaller piece size portion to remove at least a portion of said containers from said smaller piece size portion;
   (F) recovering said containers;
   (G) subjecting said smaller piece size portion to a magnetic separation operation to provide a magnetic portion and a non-magnetic portion;
   (H) recovering said magnetic portion from said magnetic separation operation;
   (I) classifying said non-magnetic portion formed in step (G) into size range components, said size range components comprising at least a small size range component, an intermediate size range component and a large size range component;
   (J) subjecting said large size range component to a picking operation to remove discrete materials therefrom according to selected product categories, said product categories comprising at least glass, plastics, fabrics, metals, fiberboard and paper;
   (K) separately recovering said discrete materials in each of said selected product categories;
   (L) subjecting said large size range component and said intermediate size range component to a particle size reduction operation;
   (M) combining the product of step (L) with said small size range component from the classifying operation to form a uniform organic mass;
   (N) adding aerobic bacteria to said organic mass;
   (O) composting said organic mass to form a sterile compost; and
   (P) recovering said sterile compost.

2. A process as recited in claim 1 which further comprises adding raw sewage and at least a portion of said paper recovered in step (K) to said organic mass produced in step (M).

3. A process for recovering valuable materials from a burden comprising a mixture of organic and inorganic materials such as are found in municipal waste, at least a portion of said materials being carried in containers, which comprises the steps of:
   (A) separating said burden by a sizing operation into a larger piece size portion and a smaller piece size portion;
   (B) separating said larger piece size portion according to selected product categories;
   (C) recovering the materials in each said product category;
   (D) puncturing said containers of materials present in said smaller piece size portion to allow their contents to mix with the remainder of said smaller piece size portion;
   (E) applying a suction to said smaller piece size portion to remove at least a portion of said containers from said smaller piece size portion;
   (F) recovering said containers;
   (G) subjecting said smaller piece size portion to a magnetic separation operation to provide a magnetic portion and a non-magnetic portion;
   (H) breaking-up said magnetic portion to release magnetic particles therefrom;
   (I) subjecting said broken-up magnetic portion to a further magnetic separation operation to provide a magnetic component and a non-magnetic component;
   (J) separately recovering said magnetic component and said non-magnetic component;
   (K) classifying said non-magnetic portion formed in step (G) into size range components, said size range components comprising at least a small size range component, an intermediate size range component and a large size range component;
   (L) subjecting said large size range component to a picking operation to remove discrete materials therefrom according to selected produt categories, said product categories comprising at least glass, plastics, fabrics, metals, fiberboard and paper;
   (M) separately recovering said discrete materials in each of said selected product categories;
   (N) comminuting said picked large size range component and said intermediate size range component;
   (O) feeding the comminuted product of step (N) onto an inclined surface to release dense, resilient materials therefrom and allow said dense, resilient materials to flow down said inclined surface and be removed;
   (P) combining the materials remaining on said inclined surface with said small size range component formed in step (K) to form a substantially organic mass;
   (Q) adding raw sewage and at least a portion of said paper recovered in step (M) to said organic mass;
   (R) adding aerobic bacteria to the product of step (Q);
   (S) composting the product of step (R) to form a sterile compost; and
   (T) recovering said sterile compost.

4. A process for the production and recovery of valuable materials from a burden comprising a mixture of organic and inorganic materials such as are found in municipal waste, at least a portion of such materials being carried in containers, which comprises the steps of:
   (A) separating said burden by a sizing operation into a larger piece size portion and a smaller piece size portion;
   (B) separating said larger piece size portion according to selected product categories;
   (C) recovering the materials in each said product category;
   (D) puncturing said containers of materials present in said smaller piece size portion to allow their contents to mix with the remainder of said smaller piece size portion;
   (E) applying a suction to said smaller piece size portion to remove at least a portion of said containers from said smaller piece size portion;
   (F) subjecting said smaller piece size portion to a magnetic separation operation to provide a magnetic portion and a non-magnetic portion;
   (G) recovering said magnetic portion from said magnetic separation operation;
   (H) removing discrete portions of manufactured goods from said non-magnetic portion leaving a substantially organic mass, said manufactured good comprising at least glass, plastics, fabrics, metals, fiberboard and paper;
   (I) separately recovering said manufactured good;
   (J) subjecting said organic mass to a size reduction operation;
   (K) adding aerobic bacteria to said organic mass;

(L) composting said organic mass to form a sterile compost; and (M) recovering said sterile compost.

5. A process as recited in claim 4 wherein recovering said magnetic portion from said magnetic separation operation comprises the steps of breaking-up said magnetic portion to release magnetic particles therefrom; subjecting said broken-up magnetic portion to a further magnetic separation operation to provide a magnetic component and a non-magnetic component; and separately recovering said magnetic component and said non-magnetic component.

6. A process as recited in claim 4 which further comprises adding raw sewage to said organic mass after completion of step (J).

References Cited

UNITED STATES PATENTS

| | | | |
|---|---|---|---|
| 3,113,014 | 12/1963 | Foth | 71—9 |
| 3,236,604 | 2/1966 | Pierson | 71—9 |
| 3,285,732 | 11/1966 | Schulze | 71—9 |

FOREIGN PATENTS

| | | | |
|---|---|---|---|
| 112,192 | 10/1962 | Pakistan | 71—9 |

REUBEN FRIEDMAN, Primary Examiner

C. N. HART, Assistant Examiner

U.S. Cl. X.R.

71—10, 12

UNITED STATES PATENT OFFICE
CERTIFICATE OF CORRECTION

Patent No. 3,579,320          Dated May 18, 1971

Inventor(s) Marvin Pesses

It is certified that error appears in the above-identified patent and that said Letters Patent are hereby corrected as shown below:

In the heading to the printed specification, line 5, "Marvin Presses" should read -- Marvin Pesses --.

Column 2, line 22, "provided" should read -- provide --.

Column 5, line 12, "pased" should read -- passed --.

Column 8, in Table III, "Lbs. organic matter per ton - 1680 lbs.", "1680" should read -- 1860 --.

Column 10, line 20, "three" should read -- there --; line 21, "produt" should read -- product --; lines 69 and 72, "good" should read -- goods --, each occurrence.

Signed and sealed this 2nd day of May 1972.

(SEAL)
Attest:

EDWARD M. FLETCHER, JR.          ROBERT GOTTSCHALK
Attesting Officer                Commissioner of Patents